United States Patent
Miki et al.

(10) Patent No.: US 11,654,400 B2
(45) Date of Patent: May 23, 2023

(54) POROUS HOLLOW FIBER MEMBRANE AND METHOD FOR PRODUCING POROUS HOLLOW FIBER MEMBRANE

(71) Applicant: ASAHI KASEI KABUSHIKI KAISHA, Tokyo (JP)

(72) Inventors: Yuki Miki, Tokyo (JP); Daisuke Okamura, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 496 days.

(21) Appl. No.: 16/348,268

(22) PCT Filed: Oct. 26, 2017

(86) PCT No.: PCT/JP2017/038805
§ 371 (c)(1),
(2) Date: May 8, 2019

(87) PCT Pub. No.: WO2018/088232
PCT Pub. Date: May 17, 2018

(65) Prior Publication Data
US 2019/0314767 A1   Oct. 17, 2019

(30) Foreign Application Priority Data

Nov. 9, 2016   (JP) .............................. JP2016-218598

(51) Int. Cl.
*B01D 69/02*     (2006.01)
*B01D 69/14*     (2006.01)
(Continued)

(52) U.S. Cl.
CPC ......... *B01D 69/02* (2013.01); *B01D 67/0016* (2013.01); *B01D 67/0079* (2013.01);
(Continued)

(58) Field of Classification Search
CPC ............ B01D 2323/08; B01D 2323/21; B01D 2325/02; B01D 2325/04; B01D 2325/24;
(Continued)

(56) References Cited

U.S. PATENT DOCUMENTS 4,664,669 A * 5/1987 Ohyabu ................. B01D 69/02
                                                        210/500.21
2009/0297822 A1   12/2009 Fujimura et al.
(Continued)

FOREIGN PATENT DOCUMENTS

CN   102574068 A   7/2012
CN   102872731 A   1/2013
(Continued)

OTHER PUBLICATIONS

Akira Takizawa, Membranes, Jan. 30, 1992, pp. 404-406 with a partial English translation.
(Continued)

*Primary Examiner* — Dirk R Bass
(74) *Attorney, Agent, or Firm* — Kenja IP Law PC

(57) ABSTRACT

Provided is a porous hollow fiber membrane made of a thermoplastic resin, wherein a membrane thickness is 0.050 mm or larger and 0.25 mm or smaller, and when a strength coefficient is defined as K=(compressive strength)/((membrane thickness)/(inside diameter/2))$^3$, K=1.7 or more.

6 Claims, 5 Drawing Sheets

(51) Int. Cl.
*B01D 69/08* (2006.01)
*B01D 67/00* (2006.01)
*B01D 71/34* (2006.01)
*B01D 71/02* (2006.01)
*C08J 9/26* (2006.01)

(52) U.S. Cl.
CPC ......... *B01D 69/081* (2013.01); *B01D 69/087* (2013.01); *B01D 69/148* (2013.01); *B01D 71/027* (2013.01); *B01D 71/34* (2013.01); *C08J 9/26* (2013.01); *B01D 2325/02* (2013.01); *B01D 2325/04* (2013.01); *C08J 2327/16* (2013.01)

(58) Field of Classification Search
CPC ............ B01D 67/0013; B01D 67/0016; B01D 67/0079; B01D 69/02; B01D 69/08; B01D 69/081; B01D 69/087; B01D 69/12; B01D 69/148; B01D 71/027; B01D 71/34; C08J 2327/16; C08J 9/26; D01F 6/12
See application file for complete search history.

(56) References Cited

U.S. PATENT DOCUMENTS

2012/0125850 A1\* 5/2012 Fujimura ............... B01D 71/34
 210/650
2016/0325237 A1 11/2016 Okamura et al.

FOREIGN PATENT DOCUMENTS

| CN | 105980039 A | 9/2016 |
| JP | H06128406 A | 5/1994 |
| JP | 2008036635 A | 2/2008 |
| JP | 5717987 B2 | 5/2015 |
| KR | 1020130009941 A | 1/2013 |
| WO | 2007043553 A1 | 4/2007 |
| WO | 2011129023 A1 | 10/2011 |
| WO | 2015104871 A1 | 7/2015 |

OTHER PUBLICATIONS

Dictionary of Plastic/Functional Polymer Materials, edited by Editorial Committee of Dictionary of Plastic/Functional Polymer Materials, Feb. 2004, pp. 672-679 with a partial English translation.

Douglas R.Lloyd et al., Microporous membrane formation via thermally-induced phase separation. II. Liquid—liquid phase separation, Journal of Membrane Science, Nov. 15, 1991, pp. 1-11, vol. 64, Issues 1-2.

Hideto Matsuyama, Preparation of polymeric porous membranes by thermally induced phase separation (TIPS), Chemical Engineering, Jun. 1, 1998, pp. 45-56, vol. 43, No. 6 with a partial English translation.

Jan. 9, 2018, International Search Report issued in the International Patent Application No. PCT/JP2017/038805.

May 14, 2019, International Preliminary Reporton Patentability issued in the International Patent Application No. PCT/JP2017/038805.

\* cited by examiner

POROUS HOLLOW FIBER MEMBRANE AND METHOD FOR PRODUCING POROUS HOLLOW FIBER MEMBRANE

CROSS-REFERENCE OF RELATED APPLICATION

The present application claims the priority of Japanese Patent Application No. 2016-218598 filed in Japan on Nov. 9, 2016, the disclosure of which is incorporated herein by reference in its entirety.

TECHNICAL FIELD

The present disclosure relates to a porous hollow fiber membrane and a method for producing the porous hollow fiber membrane.

BACKGROUND

In recent years, filtration methods based on porous hollow fiber membranes having the advantages of improving the safety of treated water and conserving space have been widely prevalent as methods for clarifying river water and using the resultant as clean water or the like. The porous hollow fiber membranes are required to have three performances: high blocking performance which can reliably remove bacteria such as *cryptosporidium*, or suspended components; high water permeability performance for treating a large amount of water; and high strength which permits long-term use under a wide range of operating conditions including chemical washing and high operation pressures.

The filtration systems using the porous hollow fiber membranes include two systems: an internal pressure filtration system in which filtration is performed from the inner surface side toward the outer surface side of the membrane, and an external pressure filtration system in which filtration is performed from the outer surface side toward the inner surface side. In the case of using a porous hollow fiber membrane in the field of water treatment, an external pressure filtration system which can secure a large filtering area is typically used. Hence, the porous hollow fiber membrane is required to have high strength, i.e., high compressive strength, in the external pressure direction so as not to crush the hollow fiber membrane during filtration operation. Furthermore, one of the methods for decreasing resistance during filtration or pressure loss within the hollow fiber membrane is a method of decreasing a membrane thickness and increasing the inside diameter of the hollow fiber membrane. However, this performance is contradictory to compressive strength, and it has been difficult to achieve both the performances.

PTL 1 discloses a method for producing a porous hollow fiber membrane by a thermally induced phase separation method. Although describing compressive strength, this literature takes no view of improving filtration performance by decreasing a membrane thickness. Thus, this method has the difficulty in achieving both high filtration performance and compressive strength.

CITATION LIST

Patent Literature

PTL 1: Japanese Patent No. 5717987

Non-Patent Literature

NPL 1: Editorial Committee of Dictionary of Plastic/Functional Polymer Materials, "Dictionary of Plastic/Functional Polymer Materials", Industrial Research Center of Japan, February 2004, p. 672-679

NPL 2: Hideto Matsuyama, "Preparation of polymeric porous membranes by thermally induced phase separation (TIPS)", Chemical Engineering, June 1998, p. 45-56, Kagaku Kogyo-sha Co., Ltd.

NPL 3: Akira Takizawa, "Membranes", published in January 1992, p. 404-406, IPC Co., Ltd.

NPL 4: D. R. Lloyd, et. al., Journal of Membrane Science, 64 (1991) 1-11

SUMMARY

Technical Problem

An object of the present disclosure is to provide a porous hollow fiber membrane that has high strength suitable for the purpose of filtration and is excellent in water permeability performance, and a method for producing the porous hollow fiber membrane.

An object of the present disclosure is to provide a porous hollow fiber membrane that exerts water permeability performance improved by decrease in resistance during filtration or pressure loss within the hollow fiber membrane, while having sufficient strength capable of enduring long-term operation in the case of external pressure filtration, particularly, suction filtration, and a method for producing the porous hollow fiber membrane.

Solution to Problem

The inventors of the present disclosure have conducted diligent studies to attain the objects and consequently reached the present disclosure. Specifically, the present disclosure is as follows.

The porous hollow fiber membrane of the present disclosure is a porous hollow fiber membrane made of a thermoplastic resin, wherein a membrane thickness is 0.050 mm or larger and 0.25 mm or smaller, and when a strength coefficient is defined as K=(compressive strength)/((membrane thickness)/(inside diameter/2))$^3$, K=1.7 or more.

In the porous hollow fiber membrane of the present disclosure, a coefficient of variation in a thickness of a backbone forming a surface on the filtration side is preferably 80% or less.

In the porous hollow fiber membrane of the present disclosure, a pore ratio of the surface on the filtration side is preferably 32% or more.

In the porous hollow fiber membrane of the present disclosure, the thickness of the backbone forming a surface on the filtration side is preferably 0.20 μm or larger and 20 μm or smaller.

In the porous hollow fiber membrane of the present disclosure, preferably, the inside diameter is 0.75 mm or larger, the compressive strength is 0.30 MPa or more, and the porous hollow fiber membrane is in a hollow fiber form having a three-dimensional network structure.

The porous hollow fiber membrane of the present disclosure preferably consists of at least two layers.

Preferably, the porous hollow fiber membrane of the present disclosure consists of at least two layers, a pore ratio of a surface on the pre-filtration side is 32% to 60%, and a pore size is 500 nm or smaller.

The hollow fiber membrane module of the present disclosure is a hollow fiber membrane module having a hollow fiber membrane bundle and fixing parts at both ends of the hollow fiber membrane bundle, wherein: the end of one of the fixing parts seals a hollow part of the hollow fiber membrane, and the end of the other fixing part opens the hollow part of the hollow fiber membrane; the hollow fiber membrane module is of external pressure type in which filtration is performed from the outside of the hollow fiber membrane where the hollow fiber membrane is exposed, to the inside thereof; and when a strength coefficient of the hollow fiber membrane is defined as K=(compressive strength)/((membrane thickness)/(inside diameter/2))$^3$, K=1.7 or more.

The method for producing the porous hollow fiber membrane of the present disclosure is a method for producing the aforementioned porous hollow fiber membrane wherein the porous hollow fiber membrane consists of at least two layers, a pore ratio of a surface on the pre-filtration side is 32% to 60%, and a pore size is 500 nm or smaller, wherein when a difference between a discharge temperature at a discharge port of a melt-kneaded product which is a starting material of the porous hollow fiber membrane and an internal temperature of a coagulation bath where the melt-kneaded product is coagulated is defined as ΔT, and a time required for the melt-kneaded product in a hollow form to pass through a free traveling part from the discharge port to the liquid surface of the coagulation bath is defined as free traveling time t, cooling rate ΔT/t is 180° C./s or more and 340° C./s or less.

In the method for producing the porous hollow fiber membrane of the present disclosure, the free traveling time required for the melt-kneaded product in a hollow form to pass through a free traveling part from the discharge port of the melt-kneaded product to the liquid surface of a coagulation bath where the melt-kneaded product is coagulated is preferably 0.50 seconds or longer.

In the method for producing the porous hollow fiber membrane of the present disclosure, raw materials of the melt-kneaded product are preferably three components of a thermoplastic resin, an inorganic fine powder and a solvent.

In the method for producing the porous hollow fiber membrane of the present disclosure, the inorganic fine powder is preferably silica.

In the method for producing the porous hollow fiber membrane of the present disclosure, the thermoplastic resin is preferably polyvinylidene fluoride (PVDF).

In the method for producing the porous hollow fiber membrane of the present disclosure, a melt-kneaded product for use in the production of a layer including a surface on the filtration side in the porous hollow fiber membrane preferably has a thermoplastic resin concentration of 35% by mass or higher and 48% by mass or lower.

In the method for producing the porous hollow fiber membrane of the present disclosure, a melt-kneaded product for use in the production of a layer including a surface on the pre-filtration side in the porous hollow fiber membrane preferably has a thermoplastic resin concentration of 20% by mass or higher and 35% by mass or lower.

In the method for producing the porous hollow fiber membrane of the present disclosure, a solvent that satisfies a condition of parameter P represented by the following expression is preferably used in the production of a layer including a surface on the pre-filtration side in the porous hollow fiber membrane:

$$P=((\sigma dm-\sigma dp)^2+(\sigma pm-\sigma pp)^2+(\sigma hm-\sigma hp)^2)^{0.5} \leq 7.8$$

wherein σdm and σdp represent dispersion force terms of the solvent and polyvinylidene fluoride, respectively; σpm and σpp represent dipole bonding force terms of the solvent and polyvinylidene fluoride, respectively; and σhm and σhp represent hydrogen bond terms of the solvent and polyvinylidene fluoride, respectively.

In the method for producing the porous hollow fiber membrane of the present disclosure, a solvent that satisfies a condition of parameter P represented by the following expression is preferably used in the production of a layer including a surface on the filtration side in the porous hollow fiber membrane:

$$P=((\sigma dm-\sigma dp)^2+(\sigma pm-\sigma pp)^2+(\sigma hm-\sigma hp)^2)^{0.5} > 7.8$$

wherein σdm and σdp represent dispersion force terms of the solvent and polyvinylidene fluoride, respectively; σpm and σpp represent dipole bonding force terms of the solvent and polyvinylidene fluoride, respectively; and σhm and σhp represent hydrogen bond terms of the solvent and polyvinylidene fluoride, respectively.

The filtration method of the present disclosure is a filtration method using the aforementioned porous hollow fiber membrane of the present disclosure.

The filtration method of the present disclosure is preferably a suction filtration method.

The filtration method of the present disclosure is a method for filtering a medium to be filtered through a hollow fiber membrane module, comprising the steps of: dipping the hollow fiber membrane module having an exposed hollow fiber membrane in a tank having the medium to be filtered; and filtering the medium to be filtered from the outside to the inside of the hollow fiber membrane, wherein when a strength coefficient of the hollow fiber membrane is defined as K=(compressive strength)/((membrane thickness)/(inside diameter/2))$^3$, K=1.7 or more.

Advantageous Effect

The present disclosure can provide a porous hollow fiber membrane that has high strength suitable for the purpose of filtration and is excellent in water permeability performance, and a method for producing the porous hollow fiber membrane.

DETAILED DESCRIPTION

Figure 1:
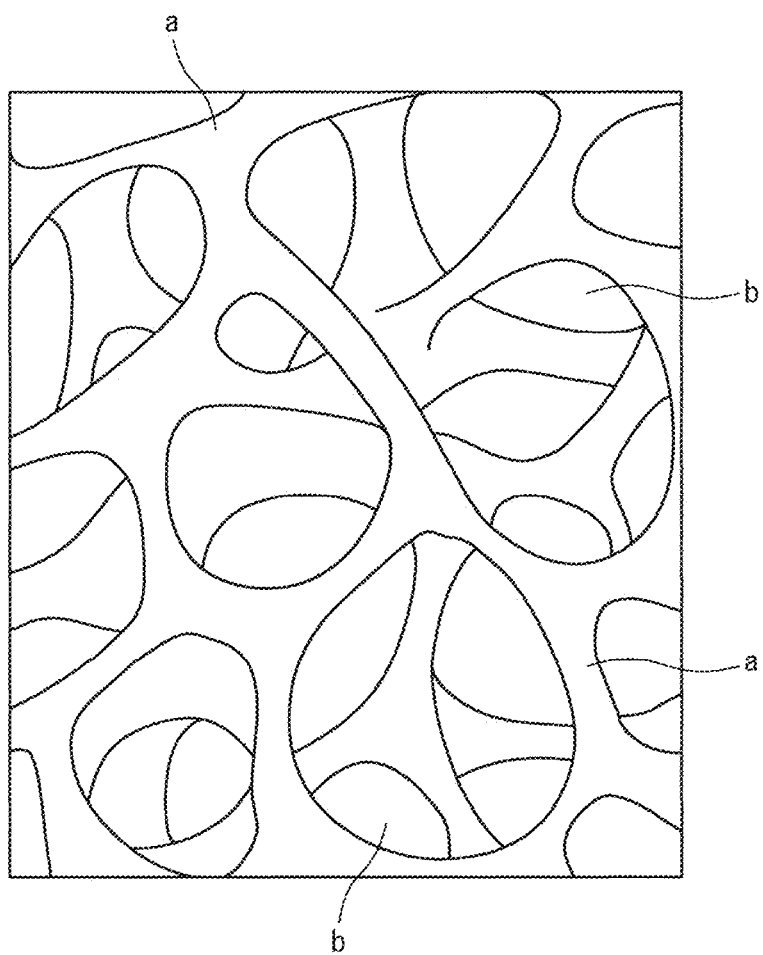
FIG. 1 is a schematic view of a three-dimensional network structure.

Hereinafter, preferred embodiments of the present disclosure will be described in detail with reference to the drawings. In the description, the same symbols will be used to designate the same factors or factors having the same functions, so that the description will be omitted.

The porous hollow fiber membrane of the present embodiment is made of a thermoplastic resin, wherein a membrane thickness is 0.050 mm or larger and 0.25 mm or smaller, and when a strength coefficient is defined as K=(compressive strength)/((membrane thickness)/(inside diameter/2))$^3$, K=1.7 or more.

The porous hollow fiber membrane means a membrane having a hollow ring form. In the case of the porous hollow fiber membrane, it is possible to increase a membrane area per module unit volume as compared with a flat membrane.

The membrane thickness of the porous hollow fiber membrane of the present embodiment is preferably 0.050 mm or larger and 0.25 mm or smaller. When the membrane thickness is 0.050 mm or larger, the porous hollow fiber membrane can have strength with no practical problem. When the membrane thickness is 0.25 mm or smaller, resistance during filtration is small. Furthermore, in the case of the porous hollow fiber membrane, an inside diameter can be increased with an outside diameter kept constant. Therefore, pressure loss within the porous hollow fiber membrane tube can be reduced. The membrane thickness is more preferably 0.10 mm or larger and 0.24 mm or smaller.

The inside diameter of the porous hollow fiber membrane is desirably 0.75 mm or larger and 1.5 mm or smaller. When the inside diameter is 0.75 mm or larger, pressure loss within the porous hollow fiber membrane can be reduced. Although there is no particular upper limit on the inside diameter, an inside diameter of 1.5 mm or smaller can increase the number of porous hollow fiber membranes with which a container is packed. The inside diameter is preferably 0.76 mm or larger and 1.4 mm or smaller.

When the strength coefficient of the porous hollow fiber membrane described above is defined according to the following expression (1), the strength coefficient is 1.7 or more.

[Expression 1]

$$K=\text{(Compressive strength)}/((\text{Membrane thickness})/(\text{Inside diameter}/2))^3 \quad (1)$$

The strength coefficient is based on Timoshenko's buckling equation of thin circular rings. When a hollow fiber membrane is crushed by force in the external pressure direction, the hollow fiber membrane is often crushed into a shape similar to that when a thin circular ring is buckled. Therefore, this theoretical equation is used as a basis. In the present application, the constant term of the theoretical equation is defined as a strength coefficient, and a strength coefficient of 1.7 or more means that compressive strength is high with respect to the membrane thickness and the inside diameter, and both high strength and high filtration performance can be achieved. The strength coefficient is preferably 1.8 or more, more preferably 1.9 or more. There is no particular limitation on the strength coefficient because a higher strength coefficient is better. The strength coefficient is preferably 60 or less, more preferably 50 or less, further preferably 40 or less.

When a surface on the source water (medium to be filtered) side (pre-filtration side) of the porous hollow fiber membrane described above is defined as surface FA, and the other surface (surface on the filtration side) is defined as surface FB, the coefficient of variation (=(standard deviation/mean)×100) in the thickness of a backbone forming the surface FB is preferably 80% or less. In the case of using the porous hollow fiber membrane in an external pressure filtration system, the outer surface corresponds to the surface FA, and the inner surface corresponds to the surface FB. As for the strength of the porous hollow fiber membrane, deformation originates from a thin portion of a backbone forming the porous hollow fiber membrane. Accordingly, provided that the coefficient of variation in the thickness of a backbone forming the surface FB is 80% or less, the distribution of the thickness of the backbone is narrow. Thus, the compressive strength of the porous hollow fiber membrane can be kept high. If the membrane thickness is decreased, such a more uniform thickness of the backbone allows for higher compressive strength than ever. The coefficient of variation in the thickness of a backbone forming the surface FB is preferably 70% or less, more preferably 60% or less. In the case of using the porous hollow fiber membrane in an internal pressure filtration system, the inner surface corresponds to the surface FA, and the outer surface corresponds to the surface FB.

The thickness of the backbone of the surface FB is 0.20 μm or larger and 20 μm or smaller, and the pore size of the surface FB is 0.30 μm or larger and 10 μm or smaller. The compressive strength is preferably 0.30 MPa or more from a practical standpoint.

The pore ratio of the surface FB of the porous hollow fiber membrane described above is preferably 32% or more and 60% or less. It has heretofore been known that a pore ratio on the source water side is increased (e.g., Japanese Patent No. 3781679). The inventors of the present disclosure have further found that filtration stability can be enhanced by increasing the pore ratio of the surface FB on the filtered water side. Provided that the pore ratio is 32% or more, filtered water more efficiently passes through a membrane thickness part. Therefore, filtration performance can be enhanced. Provided that the pore ratio is 60% or less, strength is not reduced. The pore ratio is preferably 33% or more and 50% or less.

The pore ratio of the surface FA is preferably 32% or more and 60% or less. Use of a membrane having a pore ratio of 32% or more of the surface FA on the side in contact with source water can reduce deterioration in water permeability performance ascribable to clogging and deterioration in water permeability performance ascribable to membrane surface abrasion, and can enhance filtration stability. However, if the pore size of the surface FA even having a high pore ratio is large, the quality of filtered water is worsened. Hence, the pore size of the surface FA is 500 nm or smaller, preferably 30 nm or larger and 500 nm or smaller, more preferably 50 nm or larger and 450 nm or smaller.

The rate of pure water permeation of the porous hollow fiber membrane is preferably 1000 L/m$^2$/hr or more and 20000 L/m$^2$/hr or less. When the rate of pure water permeation falls within this range, both filtration performance and blocking performance can be achieved. The rate of pure water permeation is more desirably 1200 L/m$^2$/hr or more and 18000 L/m$^2$/hr or less.

The porous membrane forming the porous hollow fiber membrane desirably has a three-dimensional network structure. The three-dimensional network structure described in the present application schematically refers to a structure illustrated in FIG. 1. As seen therefrom, the network is formed by the joining of thermoplastic resins a to form void parts b. In the three-dimensional network structure, lumps of resins having a so-called spherocrystal structure are rarely seen. The void parts b of the three-dimensional network structure are surrounded by the thermoplastic resins a, and each portion of the void part b is communicated with each portion of another void part b. Most of thermoplastic resins used form a three-dimensional network structure capable of contributing to the strength of the hollow fiber membrane. Therefore, a supporting layer having high strength can be formed. Also, chemical resistance is improved. Although the reason why chemical resistance is improved is not clear, this is probably because even the network partially attacked by a chemical has no large influence on the strength of the whole layer because of a large amount of thermoplastic resins forming the network capable of contributing to strength.

The porous hollow fiber membrane may have a monolayer structure or may have a bilayer or more multilayer structure. In the case of a multilayer structure, a layer having the surface FA is referred to as a layer (A), and a layer having the surface FB is referred to as a layer (B).

For example, functions are assigned such that: the layer (A) is used as a so-called blocking layer and allowed to exert the function of blocking the permeation, into the membrane, of foreign matters contained in a liquid to be treated (source water) owing to a small surface pore size; and the layer (B) is used as a so-called supporting layer, and this supporting layer has the function of minimizing reduction in water permeability while insuring high mechanical strength. The assignment of functions to the layer (A) and the layer (B) is not limited to that described above.

Hereinafter, a bilayer structure where the layer (A) is used as a blocking layer, and the layer (B) is used as a supporting layer will be described. The thickness of the layer (A) is preferably $1/100$ or more and less than $40/100$ of the membrane thickness. Such a relatively large thickness of the layer (A) renders the membrane usable even if insoluble matters such as sand or aggregates are contained in source water. This is because a surface pore size is not changed even if the membrane is somewhat worn. Provided that the thickness falls within this range, the balance between desirable blocking performance and high water permeability performance is achieved. The thickness is more preferably $2/100$ or more and $30/100$ or less, further preferably $2/100$ or more and $25/100$ or less, of the membrane thickness. The thickness of the layer (A) is preferably 1 μm or larger and 100 μm or smaller, more preferably 2 μm or larger and 80 μm or smaller.

Next, the method for producing the porous hollow fiber membrane of the present embodiment will be described.

Examples of the method for producing the porous hollow membrane of the present embodiment include a thermally induced phase separation method. In this process, a thermoplastic resin and an organic liquid are used. This organic liquid used is a solvent that does not dissolve the thermoplastic resin at room temperature, but dissolves the thermoplastic resin at a high temperature, i.e., a latent solvent. A method which involves kneading the thermoplastic resin and the organic liquid at a high temperature to dissolve the thermoplastic resin in the organic liquid, then inducing phase separation by cooling to room temperature, and further removing the organic liquid to produce a porous body (thermally induced phase separation method) has the following advantages:

(a) the membrane can be produced from a polymer, such as polyethylene, which lacks an appropriate solvent that can dissolve the polymer at room temperature; and (b) particularly, when the thermoplastic resin is a crystalline resin, membrane production by dissolution at a high temperature followed by solidification by cooling promotes crystallization during the membrane production and facilitates obtaining a highly strong membrane.

Because of these advantages, this method is frequently used as a method for producing a porous membrane (see e.g., NPL 1 to NPL 4).

A specific production method will be described. The production method of the present embodiment comprises the steps of: discharging a melt-kneaded product containing a thermoplastic resin, an organic liquid, and an inorganic fine powder from a spinneret having a circular ring-shaped discharge port to form a melt-kneaded product in a hollow fiber form; and coagulating the melt-kneaded product in a hollow fiber form, followed by the extraction and removal of the organic liquid and the inorganic fine powder to prepare a porous hollow fiber membrane. The melt-kneaded product may consist of two components of a thermoplastic resin and a solvent, or may consist of three components of a thermoplastic resin, an inorganic fine powder and a solvent.

The thermoplastic resin for use in the method for producing the porous hollow fiber membrane of the present embodiment is a resin that has elasticity without exhibiting plasticity at normal temperature, but is rendered moldable by exerting plasticity through appropriate heating. Also, the thermoplastic resin is a resin that recovers its original elastic body when the temperature is decreased by cooling during which no chemical change occurs in molecular structure or the like (see e.g., "Editorial Committee of Encyclopaedia Chimica ed., Encyclopaedia Chimica 6th reduced edition, Kyoritsu Shuppan Co., Ltd., p. 860 and p. 867, 1963").

Examples of the thermoplastic resin can include resins described in the section Thermoplastics (p. 829-882) in 12695 Kagaku Shohin (Chemical Products in English) (The Chemical Daily Co., Ltd., 1995), and resins described in pages 809 to 810 of Kagaku Binran, Oyo-hen (Handbook of Chemistry, Applied Chemistry Section in English), revised 3rd edition (The Chemical Society of Japan ed., Maruzen, 1980). Specific examples of the name of the thermoplastic resin include polyolefins such as polyethylene and polypropylene, polyvinylidene fluoride, ethylene-vinyl alcohol copolymers, polyamide, polyether imide, polystyrene, polysulfone, polyvinyl alcohol, polyphenylene ether, polyphenylene sulfide, cellulose acetate, and polyacrylonitrile. Among them, a crystalline thermoplastic resin such as a polyolefin, polyvinylidene fluoride, an ethylene-vinyl alcohol copolymer, or polyvinyl alcohol having crystallinity can be preferably used from the viewpoint of the exertion of strength. More preferably, a polyolefin, polyvinylidene fluoride, or the like which is highly water-resistant because of its hydrophobicity and can be expected to have durability in the filtration of usual water-based liquids can be used. Particularly preferably, polyvinylidene fluoride excellent in chemical durability such as chemical resistance can be used. Examples of the polyvinylidene fluoride include vinylidene fluoride homopolymers and vinylidene fluoride copolymers having a vinylidene fluoride ratio of 50% by mol or more. Examples of the vinylidene fluoride copolymer can include copolymers of vinylidene fluoride with one or more monomers selected from the group consisting of ethylene tetrafluoride, propylene hexafluoride, trifluorochloroethylene and ethylene. The polyvinylidene fluoride is particularly preferably a vinylidene fluoride homopolymer.

The concentration of the thermoplastic resin in the melt-kneaded product is desirably 35% by mass to 48% by mass, preferably 36% by mass to 45% by mass. The thermoplastic resin concentration of 35% by mass or higher easily insures mechanical strength. The thermoplastic resin concentration of 48% by mass or lower prevents reduction in water permeability performance.

When the porous membrane is a membrane having a bilayer structure, the concentration of the thermoplastic resin in the layer (B) is desirably 35% by mass to 48% by mass, more preferably 36% by mass to 45% by mass. The concentration of the thermoplastic resin in the layer (A) is preferably 20% by mass or higher and 35% by mass or lower, more preferably 25% by mass or higher and 35% by mass or lower. The thermoplastic resin concentration of 20% by mass or higher can achieve both the pore size and mechanical strength of the surface. The thermoplastic resin concentration of 35% by mass or lower prevents reduction in water permeability performance.

The organic liquid used serves as a latent solvent for the thermoplastic resin used in the present embodiment. In the present embodiment, the latent solvent refers to a solvent that rarely dissolves the thermoplastic resin at room temperature (25° C.), but can dissolve the thermoplastic resin at a temperature higher than room temperature. The organic liquid can be in a liquid state at a melt kneading temperature with the thermoplastic resin and is not necessarily required to be a liquid at normal temperature.

When the thermoplastic resin is polyethylene, examples of the organic liquid can include: phthalic acid esters such as dibutyl phthalate, diheptyl phthalate, dioctyl phthalate, di(2-ethylhexyl) phthalate, diisodecyl phthalate, and ditridecyl phthalate; sebacic acid esters such as dibutyl sebacate; adipic acid esters such as dioctyl adipate; trimellitic acid esters such as trioctyl trimellitate; phosphoric acid esters such as tributyl phosphate and trioctyl phosphate; glycerin esters such as propylene glycol dicaprate and propylene glycol dioleate; paraffins such as liquid paraffin; and mixtures thereof.

When the thermoplastic resin is polyvinylidene fluoride, examples of the organic liquid can include: phthalic acid esters such as dimethyl phthalate, diethyl phthalate, dibutyl phthalate, dicyclohexyl phthalate, diheptyl phthalate, dioctyl phthalate, and di(2-ethylhexyl) phthalate; benzoic acid esters such as methyl benzoate and ethyl benzoate; phosphoric acid esters such as triphenyl phosphate, tributyl phosphate, and tricresyl phosphate; ketones such as γ-butyrolactone, ethylene carbonate, propylene carbonate, cyclohexanone, acetophenone, and isophorone; and mixtures thereof.

Examples of the inorganic fine powder include silica, alumina, titanium oxide, zirconia oxide, and calcium carbonate. Particularly, fine powder silica having an average primary particle size of 3 nm or larger and 500 nm or smaller, more preferably 5 nm or larger and 100 nm or smaller, is preferred. A hydrophobic silica fine powder that is less likely to aggregate and is highly dispersible is more preferred, and hydrophobic silica having a MW (methanol wettability) value of 30% by volume or more is further preferred. In this context, the MW value is a value indicated by % by volume of methanol that completely wets a powder. Specifically, the MW value is determined by placing silica in pure water, adding methanol to below the liquid surface with stirring, and determining % by volume of methanol in the aqueous solution when 50% by mass of silica is precipitated. The aforementioned "primary particle size of the inorganic fine powder" means a value determined from the analysis of an electron micrograph. Specifically, a group of inorganic fine powder particles was first pretreated by the method of ASTM D3849. Then, the diameters of 3000 to 5000 particles in a photograph taken under a transmission electron microscope were measured, and these values are arithmetically averaged to calculate the primary particle size of the inorganic fine powder.

The amount of the inorganic fine powder added is preferably 5% by mass or higher and 40% by mass or lower in terms of the mass ratio of the inorganic fine powder to the melt-kneaded product. When the proportion of the inorganic fine powder is 5% by mass or higher, an effect brought about by inorganic fine powder kneading can be sufficiently exerted. When the proportion of the inorganic fine powder is 40% by mass or lower, stable spinning is achieved.

The melt kneading can be performed using usual melt kneading means, for example, an extruder. Hereinafter, the case of using an extruder will be mentioned. However, the means for the melt kneading is not limited to the extruder. One example of a production apparatus for use in carrying out the production method of the present embodiment is illustrated in FIG. 2.

Figure 2:
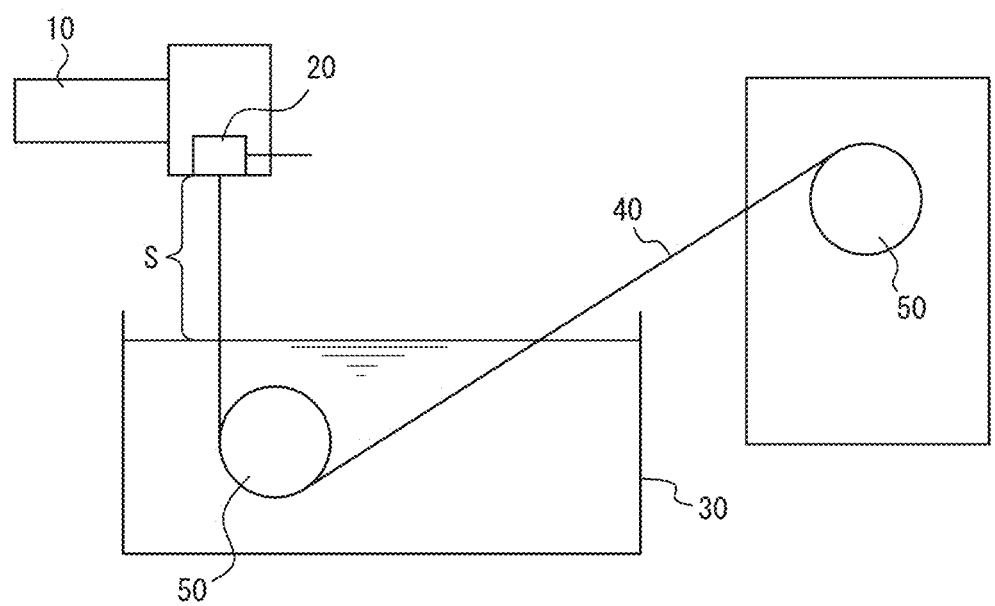
FIG. 2 is diagram illustrating the configuration of an apparatus for the production of a porous hollow fiber membrane.

The porous hollow fiber membrane production apparatus illustrated in FIG. 2 has extruder 10, nozzle 20 for hollow fiber formation, coagulation bath 30 which retains a solution coagulating a membrane production stock solution, and a plurality of rollers 50 for delivering and taking up porous hollow fiber membrane 40. Space S illustrated in FIG. 2 is a free traveling part through which a membrane production stock solution discharged from the nozzle 20 for hollow fiber formation passes before reaching the solution in the coagulation bath 30.

The nozzle 20 for hollow fiber formation having one or more concentrically disposed circular ring-shaped discharge port(s) is attached to the tip of the extruder 10, and the melt-kneaded product is extruded by the extruder 10 and discharged from the nozzle 20 for hollow fiber formation. In the case of producing a membrane having a multilayer structure, the method therefor involves attaching the nozzle 20 for hollow fiber formation having two or more circular ring-shaped discharge ports to the tips of the extruders 10, and supplying and extruding the melt-kneaded products from the different extruders 10 to the respective circular ring-shaped discharge ports, or involves producing one of the multiple layers, and coating the layer with the remaining layer(s). For example, the former production method using different extruders can obtain an extrudate in a hollow fiber form having a multilayer structure by merging the respective supplied melt-kneaded products at the discharge ports and overlaying the melt-kneaded products. In this respect, the melt-kneaded products differing in composition can be extruded from the circular ring-shaped discharge ports adjacent to each other to obtain a multilayer membrane having different pore sizes of layers adjacent to each other. The composition different between the melt-kneaded products refers to the case where constituents of the melt-kneaded products are different, or the case where the constituents are the same but differ in constitution percentage. Even the same types of thermoplastic resins are regarded as having different constituents when evidently differing in molecular weight or molecular weight distribution. The merging position of the melt-kneaded products differing in composition from each other may be the lower end face of the nozzle 20 for hollow fiber formation, or may be different from the lower end face of the nozzle 20 for hollow fiber formation.

For extruding the melt-kneaded product from the circular ring-shaped discharge port, it is preferred to discharge the melt-kneaded product such that spinneret discharge parameter R (1/sec) is a value of 10 or more and 1000 or less, because high productivity, spinning stability, and a highly strong membrane are obtained. In this context, the spinneret discharge parameter R is a value obtained by dividing discharge line velocity V (m/sec) by slit width d (m) of the discharge port. The discharge line velocity V (m/sec) is a value obtained by dividing the discharge volume ($m^3$/sec) per time of the melt-kneaded product by the cross-sectional area ($m^2$) of the discharge port. Provided that R is 10 or more, spinning is stably achieved with good productivity without any problem such as the pulsation of the thread diameter of the extrudate in a hollow form. Provided that R is 1000 or less, the elongation at break, one important strength, of the resulting porous hollow fiber membrane can be kept sufficiently high. The elongation at break is the rate of elongation with respect to the original length when the membrane is pulled in the longitudinal direction.

In the case of a porous hollow fiber membrane having a multilayer structure, a value obtained by dividing discharge line velocity V of a layered melt-kneaded product after merging of the resins by the slit width d of the discharge port is defined as spinneret discharge parameter R. The range of R is more preferably 50 or more and 1000 or less.

The melt-kneaded product in a hollow fiber form discharged from the discharge port is coagulated by passing through a coolant such as air or water. Depending on the porous hollow fiber membrane of interest, the discharged melt-kneaded product is allowed to pass through the aforementioned free traveling part S consisting of an air layer and then pass through the coagulation bath 30 containing water or the like. Specifically, the free traveling part S is a portion from the discharge port of the nozzle 20 for hollow fiber formation to the water surface of the coagulation bath 30. A container such as a tube may be used, if necessary, from the discharge port to the free traveling part S. The melt-kneaded product thus passing through the coagulation bath 30 is taken up, if necessary, into a skein or the like.

The time required for the melt-kneaded product to pass through the free traveling part S is referred to as a free traveling time. The free traveling time is desirably 0.50 seconds or longer. When the free traveling time is 0.50 seconds or longer, polymer molecules are oriented at the free traveling part. Therefore, compressive strength can be further enhanced. The free traveling time is more desirably 0.50 seconds or longer and 2.0 seconds or shorter. The free traveling time of 2.0 seconds or shorter permits stable production. The free traveling time is desirably 0.50 seconds or longer and 1.5 seconds or shorter, further preferably 0.50 seconds or longer and 1.1 seconds or shorter.

When the difference between the discharge temperature at the discharge port of the melt-kneaded product and the internal temperature of the coagulation bath 30 is defined as $\Delta T$, and the free traveling time is defined as t, cooling rate $\Delta T/t$ is preferably 180° C./s or more and 340° C./s or less. Although the reason therefor is not certain, this is presumably because the cooling rate of 180° C./s or more speeds up phase separation and therefore shortens a phase separation time so that an inhomogeneous backbone is less likely to be formed, improving a strength coefficient. The cooling rate is more preferably 185° C./s or more and 330° C./s or less.

For example, in the case of producing a hollow fiber membrane at a cooling rate of 173° C./s using a vinylidene fluoride homopolymer as the thermoplastic resin (Comparative Example 1 mentioned later), the coefficient of variation in the thickness of the backbone is 100%, and the strength coefficient is 0.9. On the other hand, in the case of producing a hollow fiber membrane at a cooling rate changed to 233° C./s (Example 1 mentioned later), the coefficient of variation in the thickness of the backbone is 52%, and the strength coefficient is 2.5.

In the case of producing a melt-kneaded product in a hollow fiber form, a fluid for hollow part formation, for example, air, is used.

A polymer-rich partial phase and an organic liquid-rich partial phase are finely present as divided portions in the coagulated product in a hollow fiber form. In the case of adding, for example, an inorganic fine powder which is fine powder silica, the fine powder silica is unevenly distributed in the organic liquid-rich partial phase. The organic liquid and the inorganic fine powder are extracted and removed from this product in a hollow fiber form so that the organic liquid-rich phase portion is vacant. Accordingly, the porous hollow fiber membrane can be obtained.

The extraction and removal of the organic liquid and the extraction and removal of the inorganic fine powder can be performed at the same time if extraction and removal with the same solvent are feasible. Usually, the organic liquid and the inorganic fine powder are separately extracted and removed.

The extraction and removal of the organic liquid employ a liquid that is miscible with the organic liquid without dissolving or denaturing the thermoplastic resin used and is suitable for extraction. Specifically, the extraction and removal of the organic liquid can be performed through contact by an approach such as dipping. The liquid is preferably volatile because the liquid can be easily removed from the hollow fiber membrane after extraction. Examples of the liquid include alcohols and methylene chloride. When the organic liquid is water-soluble, water may be used as the liquid for extraction.

The extraction and removal of the inorganic fine powder are usually performed using a water-based liquid. When the inorganic fine powder is, for example, silica, the silica is converted to silicate by contact with an alkaline solution. Subsequently, the silicate can be extracted and removed by contact with water.

The extraction and removal of the organic liquid and the extraction and removal of the inorganic fine powder may be performed in any order. When the organic liquid is immiscible with water, it is preferred to first perform the extraction and removal of the organic liquid, followed by the extraction and removal of the inorganic fine powder. Usually, the organic liquid and the inorganic fine powder coexist miscibly in the organic liquid-rich partial phase. Therefore, the extraction and removal of the inorganic fine powder can be proceeded smoothly and advantageously.

As mentioned above, the porous hollow fiber membrane can be obtained by extracting and removing the organic liquid and the inorganic fine powder from the coagulated porous hollow fiber membrane.

The hollow fiber membrane after coagulation can be drawn in the longitudinal direction of the porous hollow fiber membrane at a draw ratio in a range within 3 times at any stage (i) before the extraction and removal of the organic liquid and the inorganic fine powder, (ii) after the extraction and removal of the organic liquid and before the extraction and removal of the inorganic fine powder, (iii) after the extraction and removal of the inorganic fine powder and before the extraction and removal of the organic liquid, and (iv) after the extraction and removal of the organic liquid and the inorganic fine powder. In general, the drawing of a hollow fiber membrane in the longitudinal direction improves water permeability performance, but reduces pressure resistance performance (bursting strength and compressive strength). Therefore, the membrane thus drawn often lacks practical strength. However, the porous hollow fiber membrane obtainable by the production method of the present embodiment has high mechanical strength. Accordingly, drawing at a draw ratio of 1.1 times or more and within 3.0 times can be carried out. The drawing improves the water permeability performance of the porous hollow fiber membrane. In this context, the draw ratio refers to a value obtained by dividing a hollow fiber length after the drawing by a hollow fiber length before the drawing. For example, in the case of drawing a porous hollow fiber membrane having a hollow fiber length of 10 cm into a hollow fiber length of 20 cm, the draw ratio is 2 times according to the following expression:

20 cm/10 cm=2.

The membrane thus drawn may be heat-treated, if necessary, to enhance compressive strength. The heat treatment temperature is usually preferably equal to or lower than the melting point of the thermoplastic resin.

In the case of using, for example, PVDF (polyvinylidene fluoride) as the thermoplastic resin, it is necessary for achieving both a high pore ratio and high compressive strength to appropriately select a solvent for PVDF. First, a method for increasing a pore ratio includes a method of decreasing the concentration of PVDF, and a method of increasing the temperature of the fluid for hollow part formation as mentioned above. In the case of using a method for producing a membrane by decreasing the PVDF concentration, it is necessary to select a solvent that can achieve a high pore ratio and a small pore size because this method also increases the pore size. Parameter P given below is a relational expression of the three-dimensional solubility parameters of PVDF and the three-dimensional solubility parameters of the solvent and evaluates the solubility of PVDF and the solvent. The right-hand side three-dimensionally represents the solubility envelope of a Hansen solubility parameter and quantitatively represents a distance from the three-dimensional solubility parameters ($\sigma dp$, $\sigma pp$, and $\sigma hp$) of PVDF to the three-dimensional solubility parameters ($\sigma dm$, $\sigma pm$, and $\sigma hm$) of the solvent.

$$P=((\sigma dm-\sigma dp)^2+(\sigma pm-\sigma pp)^2+(\sigma hm-\sigma hp)^2)^{0.5}$$

wherein $\sigma dm$ and $\sigma dp$ represent dispersion force terms of the solvent and polyvinylidene fluoride, respectively; $\sigma pm$ and $\sigma pp$ represent dipole bonding force terms of the solvent and polyvinylidene fluoride, respectively; and $\sigma hm$ and $\sigma hp$ represent hydrogen bond terms of the solvent and polyvinylidene fluoride, respectively.

The concept described above is not limited by PVDF.

In the case of a porous membrane having a bilayer structure, the parameter P between the solvent and PVDF for use in the preparation of melt-kneaded product B forming the layer (B) is preferably larger than 7.8, more preferably larger than 7.8 and smaller than or equal to 10, further preferably larger than 7.8 and smaller than or equal to 9.0. When this value is 7.8 or larger, reduction in water permeability can be suppressed.

In the preparation of melt-kneaded product A forming the layer (A), the parameter P between the solvent and PVDF used is preferably 7.8 or smaller, more preferably 0 to 7.8, further preferably 3.0 to 7.8. When this value is 7.8 or smaller, a high pore ratio and a small pore size can be achieved.

For example, for the combination of di-2-ethylhexyl phthalate (DEHP) and dibutyl phthalate (DBP), the value of the parameter P of a mixed solvent of DEHP:DBP=6:1 (mass ratio) is 8.0. The type of the solvent is not limited by the combination described above, and various solvents can be appropriately used as long as the solvents have sufficiently high affinity for PVDF.

In a hollow fiber membrane module comprising the porous hollow fiber membrane of the present disclosure, preferably, porous hollow fiber membranes are bonded and fixed at the upper and lower ends of a membrane bundle consisting of a large number of porous hollow fiber membranes, and one or both of the ends is opened. The cross-sectional shape of the end for bonding and fixation is a round shape or may be a triangle, a rectangle, a hexagon, an ellipse, or the like. Particularly, a hollow fiber membrane module is preferred which has an opening of the membranes at the upper end and has, at the lower end, a skirt structure part for gas introduction (see Japanese Patent Laid-Open No. 2003-24751, etc.) and a gas introduction port which introduces the gas to the outer surface of the porous hollow fiber membrane.

As for a method for installing the hollow fiber membrane module, the longitudinal direction of the hollow fiber membranes within the hollow fiber membrane module may be a direction perpendicular or horizontal to the ground. Particularly, installation in the perpendicular direction is preferred. In the case of placing a plurality of hollow fiber membrane modules within the same tank, the site where the hollow fiber membrane modules are placed is not particularly limited. It is preferred to place the hollow fiber membrane modules at a position that attains the closest packing such that the amount of hold-up is minimized. The filtration system may be a normal flow filtration system, or may be a cross flow filtration system. A method for applying a filtration pressure may be a suction filtration system or a water head difference system.

Particularly, in the case of a filtration method based on a hollow fiber membrane module using the porous hollow fiber membrane of the present embodiment, excellent performance can be exerted by a suction filtration system. The porous hollow fiber membrane of the present embodiment possesses all of a high strength coefficient, a high rate of pure water permeation, and a high surface pore ratio, exhibits small pressure loss during suction filtration, and is not crushed even by continuous operation at the maximum transmembrane pressure of 0.1 MPa. Therefore, the porous hollow fiber membrane of the present embodiment can exert high filtration performance as a hollow fiber membrane module.

In a method for filtering a medium to be filtered through the hollow fiber membrane module comprising the porous hollow fiber membrane of the present embodiment, for example, the hollow fiber membrane module is dipped in a tank containing the medium to be filtered, and the medium to be filtered is filtered by, for example, external pressure filtration.

EXAMPLES

Hereinafter, the present embodiment will be described further specifically with reference to Examples and Comparative examples. However, the present embodiment is not limited by these examples. Measurement methods used in the present embodiment are as described below. All the measurements given below were performed at 25° C. unless otherwise specified. Hereinafter, evaluation methods will be described, and then, production methods and evaluation results of Examples and Comparative examples will be described.

(1) Measurement of Outside Diameter, Inside Diameter, and Membrane Thickness (mm)

A hollow fiber membrane was perpendicularly sliced with a razor or the like at 15-cm intervals in the longitudinal direction of the membrane, and the major axis and minor axis of an inside diameter and the major axis and minor axis of an outside diameter at the cross section were measured under a microscope. The inside diameter and the outside diameter were calculated according to the expressions (2) and (3), respectively, given below, and a value obtained by subtracting the calculated inside diameter from the calculated outside diameter was calculated as a membrane thickness. Twenty points were measured, and average values thereof were used as the inside diameter, the outside diameter, and the membrane thickness under the conditions.

[Expression 2]

$$\text{Inside diameter} = \frac{\text{Inside major axis} + \text{Inside minor axis}}{2} \quad (2)$$

$$\text{Outside diameter} = \frac{\text{Outside major axis} + \text{Outside minor axis}}{2} \quad (3)$$

(2) Rate of Pure Water Permeation (l/m²/hr)

A hollow fiber membrane was dipped in an aqueous solution containing 50% by mass of ethanol for 30 minutes and then dipped in water for 30 minutes to wet the hollow fiber membrane. One end of the wet hollow fiber membrane of approximately 10 cm in length was sealed, and an injection needle was inserted into the hollow part of the other end. Pure water of 25° C. was injected into the hollow part at a pressure of 0.1 MPa from the injection needle. The amount of permeated water was measured as to pure water that permeated the outer surface, and a pure water permeate flux was determined according to the expression given below. In this context, the effective membrane length refers to a net membrane length except for the portion in which the injection needle was inserted. The number of measurements was set to 10 points, and an average value thereof was used as the rate of pure water permeation under each condition.

[Expression 3]

$$\text{Rate of pure water permeation } [L/m^2/hr] = \frac{60 \text{ [min/hr]} \times \text{Amount of permeated water [L]}}{\pi \times \text{Membrane inside diameter [m]} \times \text{Effective membrane length [m]} \times \text{Measurement time [min]}} \quad (4)$$

(3) Compressive Strength (MPa)

One end of a wet hollow fiber membrane of approximately 5 cm in length was sealed, and the other end was open to the atmosphere. Pure water of 40° C. was pressurized from the outer surface, and permeated water came out of the end open to the atmosphere. In this respect, a system of filtering a normal flow without circulating water supplied to the membrane, i.e., a normal flow filtration system, was adopted. The pressure for pressurization was elevated by 0.01 MPa from 0.10 MPa, and each pressure was kept for 15 seconds. Permeated water that came out of the end open to the atmosphere during this time of 15 seconds was sampled. The absolute value of the amount (mass) of permeated water is increased with increase in pressure for pressurization unless the hollow part of the hollow fiber membrane is crushed. When the pressure for pressurization exceeds the compressive strength of the hollow fiber membrane, the hollow part is crushed so that clogging starts. Therefore, the absolute value of the amount of permeated water is decreased in spite of increase in pressure for pressurization. The pressure for pressurization at which the absolute value of the amount of permeated water was maximized was used as the compressive strength. In each Example or Comparative example, the number of measurements was set to 10 points, and an average value thereof was used as the compressive strength under the conditions.

(4) Method for Determining Boundary Between Layers in Case of Multilayer Structure The cross section of a membrane is observed at an accelerating voltage of 3 kV using an electron microscope SU8000 series manufactured by Hitachi, Ltd. In the present Examples and Comparative Examples, the vicinity of the boundary between layers was photographed at ×1000. When the boundary line between layers can be identified in the taken image, the boundary line is used as the boundary between layers. In the porous hollow fiber membranes of the present Examples and Comparative Examples, the boundary can be identified. Therefore, the boundary line was used as the boundary between layers.

When the boundary cannot be identified by the method described above, the boundary can also be determined by the following method. For example, the method for determining the boundary between the layer (A) and the layer (B) in the case of a porous hollow fiber membrane having a bilayer structure will be mentioned. In the following method, the layer (A) is used as a blocking layer, and the layer (B) is used as a supporting layer.

The cross section of a hollow fiber membrane was photographed under the electron microscope described above. A photograph that allows the shapes of 20 or more pores to be confirmed was used. In order to observe the whole cross section, a plurality of images are used. In the present Examples and Comparative Examples, measurement was performed at ×5000. The electron microscopic sample of the cross section was obtained by slicing a membrane sample frozen in ethanol into round sections.

Figure 3A:
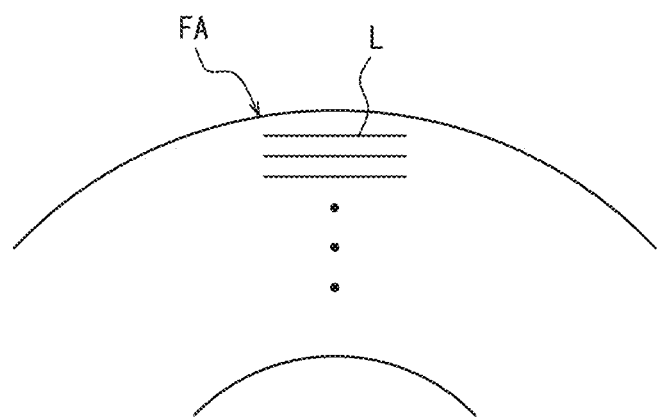
FIG. 3A is a diagram illustrating a method for measuring the boundary between layers and is a diagram illustrating a method for determining a line for defining the measurement position of the length of a pore for use in the measurement of the boundary.
Figure 3B:
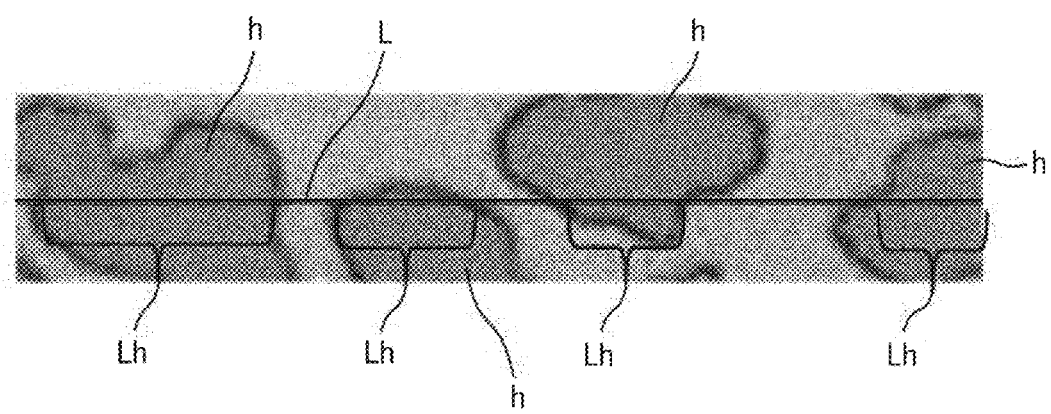
FIG. 3B is a diagram illustrating a method for measuring the boundary between layers and is a diagram illustrating a method for measuring the length of the pore using the line determined in FIG. 3A.

In the images, 100 equally spaced lines L from surface FA (i.e., lines connecting points that attained the same membrane thickness) as illustrated in FIG. 3A were drawn at intervals that divided the total membrane thickness into 101 equal parts, using commercially available image analysis software Winroof 6.1.3. As illustrated in FIG. 3B, lengths Lh where the line L crossed a portion corresponding to vacant part h were measured in the images. An average value of the crossing lengths Lh was calculated by arithmetic averaging, and a cross-sectional pore size at each membrane thickness part was determined. When the magnification of a scanning electron micrograph is sufficiently high, the equally spaced lines from the surface FA may be approximated by straight lines. The maximum value of the determined cross-sectional pore size was used to normalize the cross-sectional pore size at each membrane thickness part. The first point that reached a point at which the normalized value was closest to 0.7 from the surface FA was used as the boundary layer between the layers.

(5) Three-Dimensional Solubility Parameter

Three-dimensional solubility parameters were quoted from the following book: Hansen, Charles (2007). Hansen Solubility Parameters: A user's handbook, Second Edition. Boca Raton, Fla.: CRC press. (ISBN 978-0-8493-7248-3).

(6) Measurement of Thickness of Backbone Forming Porous Hollow Fiber Membrane and Coefficient of Variation Surface FB was photographed under the same electron microscope as in (4). Photographs are taken at a magnification that allows the shapes of 20 or more pores to be confirmed, and were taken at ×5000 in the present Examples and Comparative examples.

Figure 4:
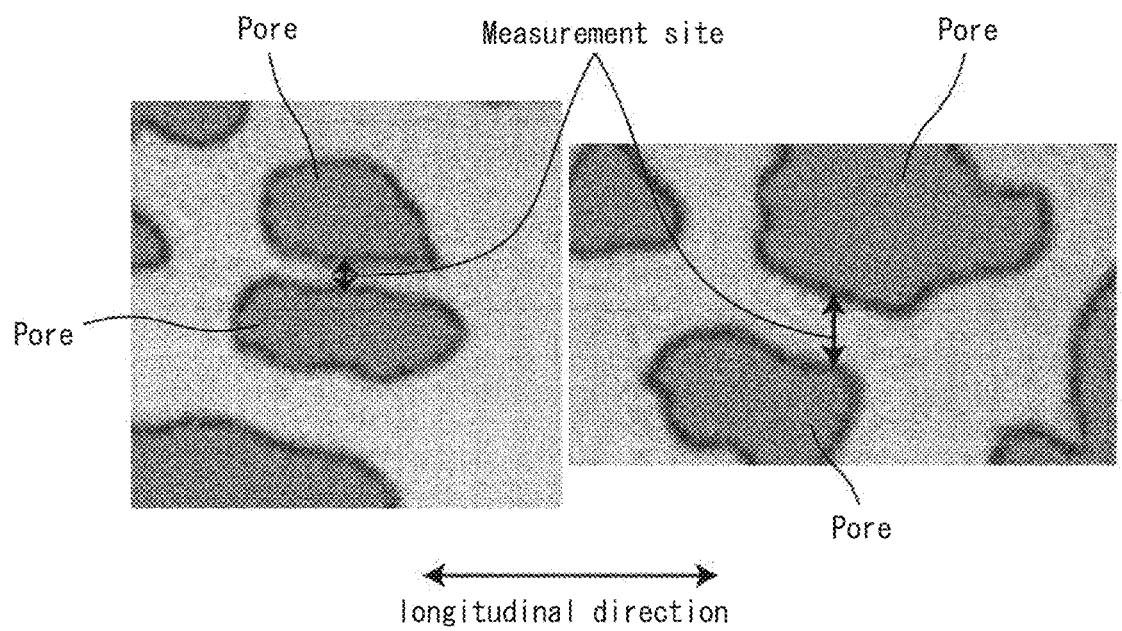
FIG. 4 illustrates an example of the measurement site of the thickness of a backbone forming a surface on the filtration side.

The taken image was used to look at a certain pore, and as illustrated in FIG. 4, its distance from a pore in a positional relationship which was in a direction perpendicular to the longitudinal direction of the hollow fiber membrane and attained the shortest distance in this perpendicular direction was used as the thickness of a backbone forming the hollow fiber membrane. FIG. 4 illustrates an example of the measurement site of the thickness of a backbone forming the surface FB on the filtration side. Some pores are inclined in the longitudinal direction. In this case, the distance between pores was defined as a distance connecting points that attained the shortest distance in a direction perpendicular to the longitudinal direction of the hollow fiber membrane. Furthermore, these two pores were excluded from subsequent measurements. In the present Examples and Comparative Examples, 100 thicknesses of backbones forming the hollow fiber membrane were measured in order from near the central part of the taken image. When the total number of backbone thicknesses measured in one image was less than 100, an image of another photographed position was used to carry out measurement in the same way as above. In this way, the measurement was carried out using a plurality of images until 100 thicknesses. An arithmetic average of the measured backbone thicknesses was determined, and the value was used as the thickness of the backbone forming the pores of the surface FB. Similarly, the coefficient of variation (=(standard deviation/mean)×100) was also calculated.

When pores are difficult to recognize on image processing software due to a small contrast of a photograph, a transparent sheet is put on a copy of the image. The pore portions are blacked out using a black pen or the like. Then, the transparent sheet is copied to a blank sheet. As a result, the pore portions indicated by black can be clearly discriminated from non-pore portions indicated by white.

(7) Inner and Outer Surface Pore Sizes and Pore Ratios

Surfaces FA and FB were photographed under the same electron microscope as in (4). Photographs are taken at a magnification that allows the shapes of 20 or more pores to be confirmed, and were taken at ×10000 for the surface FA and ×5000 for the surface FB in the present Examples and Comparative examples.

The taken image was used as described in, for example, International Publication No. WO 2001/53213. A transparent sheet was put on a copy of the image. The pore portions were blacked out using a black pen or the like, and the transparent sheet was copied to a blank sheet so that the pore portions indicated by black were clearly discriminated from non-pore portions indicated by white. Then, binarization was performed by the discriminant analysis method using commercially available image analysis software Winroof 6.1.3. An occupied area in the binary image thus obtained was determined to determine the pore ratios of the surface FA and the surface FB.

As for pore sizes, an equivalent circle diameter was calculated as to each pore present in each surface, and the areas of pores were added in the descending order of pore sizes. The pore size at which the sum reached 50% of the total of all pore areas was determined.

[Raw Material]

Raw materials used in Examples and Comparative Examples will be described below.

<Thermoplastic Resin>

Vinylidene fluoride homopolymer (manufactured by Kureha Corp., trade name: KF W #1000)

<Organic Liquid>

Bis(2-ethylhexyl) phthalate (DEHP) (manufactured by CG Ester Corp.)

Dibutyl phthalate (DBP) (manufactured by CG Ester Corp.)

<Inorganic Fine Powder>

Fine powder silica (manufactured by Nippon Aerosil Co., Ltd., trade name: R972, primary particle size: 16 nm)

Tables 1 and 2 present the formulations of obtained porous hollow fiber membranes, production conditions, and various performances of Examples 1 to 4 and Comparative Examples 1 to 5.

Example 1

A vinylidene fluoride homopolymer used as a thermoplastic resin, a mixture of di(2-ethylhexyl) phthalate and dibutyl phthalate used as an organic liquid, and fine powder silica used as an inorganic fine powder were melt-extruded into a hollow fiber membrane in an extruder using a nozzle for hollow fiber formation. The melt-kneaded product used was a melt-kneaded product having composition of vinylidene fluoride homopolymer:di(2-ethylhexyl) phthalate:dibutyl phthalate:fine powder silica=40.0:30.8:6.20: 23.1 (mass ratio). The fluid for hollow part formation used was air. Both the melt-kneaded product and air were extruded at a discharge temperature of 240° C. from a nozzle for hollow fiber formation having an outside diameter of 2.00 mm and an inside diameter of 0.92 mm.

The extruded melt-kneaded product in a hollow fiber form was traveled in the air for 0.90 seconds and then led to a coagulation bath containing water of 30° C. The obtained product in a hollow fiber form was dipped in isopropyl alcohol to extract and remove di(2-ethylhexyl) phthalate and dibutyl phthalate, followed by drying. Subsequently, the resultant was dipped in an aqueous solution containing 50% by mass of ethanol for 30 minutes, then dipped in water for 30 minutes, subsequently dipped in an aqueous solution containing 20% by mass of sodium hydroxide at 70° C. for 1 hour, and repetitively washed with water for the extraction and removal of fine powder silica to obtain a porous hollow fiber membrane.

Example 2

A porous hollow fiber membrane having a bilayer structure was produced such that the layer (A) was positioned on the outer surface side of the hollow fiber membrane, and the layer (B) was positioned on the inner surface side of the hollow fiber membrane. The thermoplastic resin used was a vinylidene fluoride homopolymer. The organic liquid used was a mixture of di(2-ethylhexyl) phthalate and dibutyl phthalate. The inorganic fine powder used was fine powder silica. The composition of a melt-kneaded product for the layer (A) was vinylidene fluoride homopolymer:di(2-ethylhexyl) phthalate:dibutyl phthalate:fine powder silica=34.0: 27.1:13.5:25.4 (mass ratio). The composition of a melt-kneaded product for the layer (B) was vinylidene fluoride homopolymer:di(2-ethylhexyl) phthalate:dibutyl phthalate: fine powder silica=40.0:31.6:5.3:23.1 (mass ratio). The fluid for hollow part formation used was air temperature-controlled to 170° C. The melt-kneaded products were extruded at a discharge temperature of 240° C. from a nozzle for hollow fiber formation having an outside diameter of 2.00 mm and an inside diameter of 0.92 mm.

The extruded melt-kneaded product in a hollow fiber form was traveled in the air for 0.90 seconds and then led to a coagulation bath containing water of 30° C. The obtained product in a hollow fiber form was dipped in isopropyl alcohol to extract and remove di(2-ethylhexyl) phthalate and dibutyl phthalate, followed by drying. Subsequently, the resultant was dipped in an aqueous solution containing 50% by mass of ethanol for 30 minutes, then dipped in water for 30 minutes, subsequently dipped in an aqueous solution containing 20% by mass of sodium hydroxide at 70° C. for 1 hour, and repetitively washed with water for the extraction and removal of fine powder silica to obtain a porous hollow fiber membrane.

Example 3

A porous hollow fiber membrane was produced in the same way as in Example 2 except that the discharge temperature of the melt-kneaded product was set to 220° C. In the porous hollow fiber membrane of Example 3, electron micrographs of the surfaces on the source water side and on the filtration side and an electron micrograph of a cross section perpendicular to the longitudinal direction of the hollow fiber membrane were taken.

Figure 5:
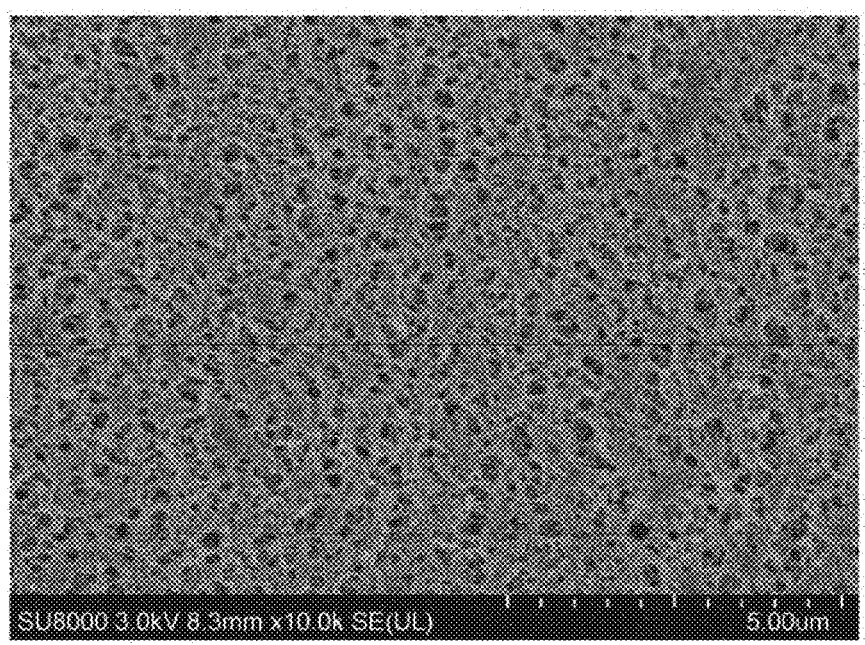
FIG. 5 is an electron micrograph at a magnification of ×10000 of surface FA of a porous hollow fiber membrane obtained in Example 3.
Figure 6:
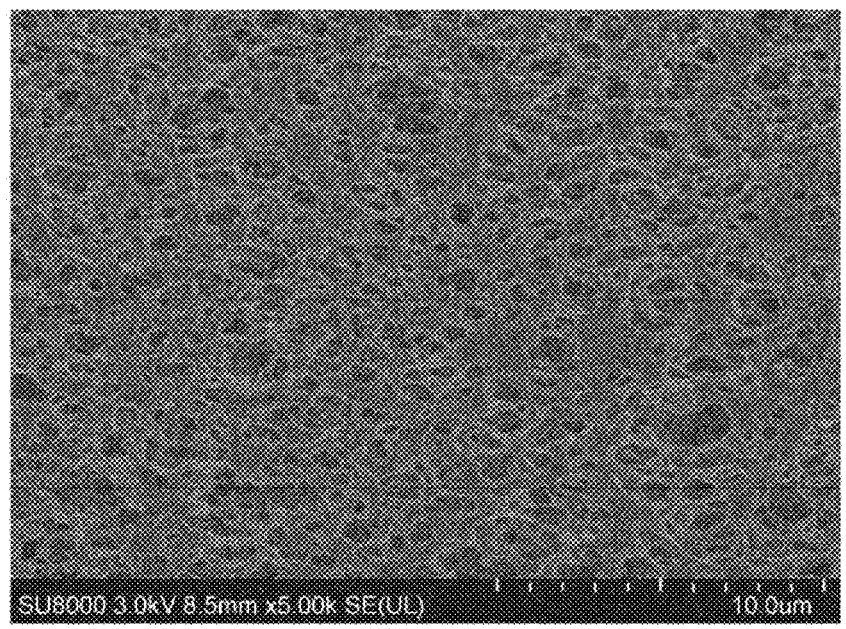
FIG. 6 is an electron micrograph at a magnification of ×5000 of surface FB of the porous hollow fiber membrane obtained in Example 3.
Figure 7:
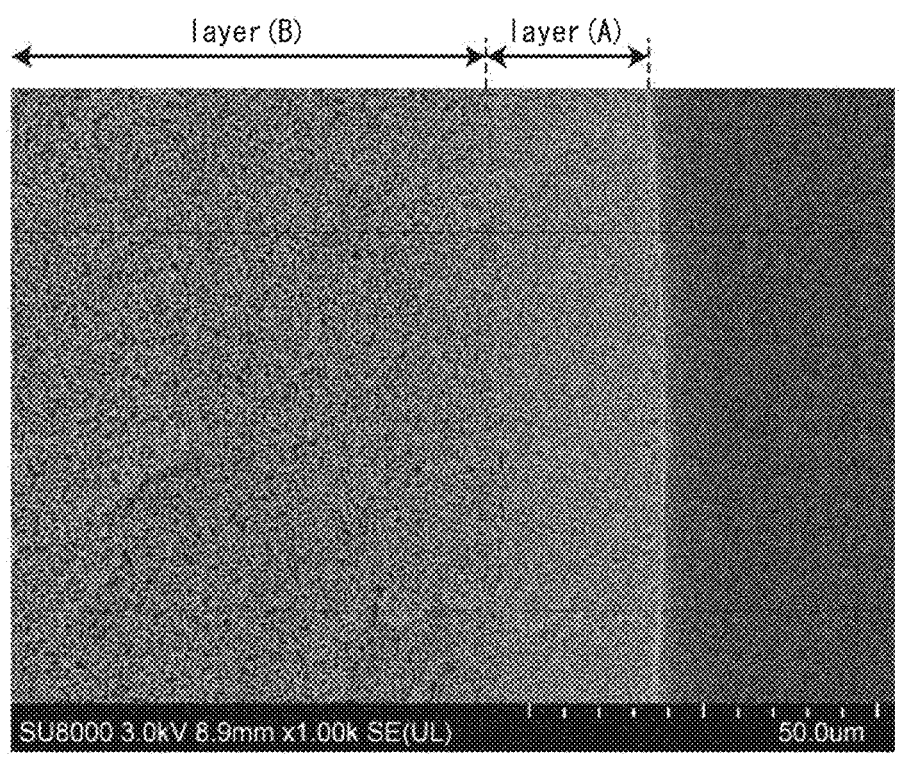
FIG. 7 is an electron micrograph at a magnification of ×1000 in the vicinity of the boundary between layers at the cross section of the porous hollow fiber membrane obtained in Example 3.

FIGS. 5 and 6 are an electron micrograph at a magnification of ×10000 of the surface FA of the obtained porous hollow fiber membrane, and an electron micrograph at a magnification of ×5000 of the surface FB thereof, respectively. FIG. 7 is an electron micrograph in the vicinity of the boundary between layers of the obtained porous hollow fiber membrane.

Example 4

A porous hollow fiber membrane was produced in the same way as in Example 3 except that the discharge temperature of the melt-kneaded product was set to 205° C., and the inside diameter of the hollow fiber membrane was set to 0.78 mm.

The porous membranes in a hollow fiber form produced in Examples 1 to 4 were each used to produce a hollow fiber membrane module wherein both ends were fixed with fixing parts; the end of one of the fixing parts sealed the hollow part of the hollow fiber membrane, and the end of the other fixing part opened the hollow part of the hollow fiber membrane; and the hollow fiber membrane module was of external pressure type in which filtration was performed from the outside of the hollow fiber membrane where the hollow fiber membrane was exposed, to the inside thereof.

The hollow fiber membrane module had a diameter of 6 inches, a membrane length of 2 m, and a membrane area of 50 m$^2$. Three such hollow fiber membrane modules, a first tank, and a second tank were used to produce a membrane separation apparatus. The first tank is a tank which installs the membrane modules vertically and has an installation floor area of 0.109 m$^2$ and an effective water depth of 2.3 m. The second tank is disposed in the upper part of the first tank and is a buffer tank which retains backwash wastewater used in physical washing and has an area of 0.25 m$^2$ at the base and an effective water depth of 0.6 m. The amount of hold-up, i.e., the amount of to-be-treated water per membrane area, at the hollow fiber membrane module installation portion of this membrane separation apparatus (=the amount of water obtained by subtracting the volume of the hollow fiber membrane constituting the hollow fiber membrane modules from the volume of the hollow fiber membrane module installation portion) was 1.36 L/m$^2$.

Continuous operation described below was carried out using this membrane separation apparatus and river water having turbidity of 1 to 5 as the to-be-treated water. A to-be-treated water supply step, a filtration step, a physical washing step, and a drainage step were combined as operation steps in the continuous operation.

As for set conditions for each operation step, in the to-be-treated water supply step, the amount of to-be-treated water supplied into the first tank was set to 12 m$^3$/hr. In the filtration step, filtration operation was started when to-be-treated water reached half the membrane length of the hollow fiber membrane (Step 1); the filtration operation was subsequently performed for approximately 26 minutes in a state where the whole hollow fiber membrane was dipped (Step 2); and the filtration operation immediately before the physical washing step and until to-be-treated water reached half the membrane length of the hollow fiber membrane was carried out (Step 3). The filtration operation was performed by using negative pressure on the secondary side of the hollow fiber membrane and applying transmembrane pressure. The membrane filtration flow rate in each (Step) of the filtration step was set to 6 m$^3$/hr (2 m$^3$/hr per hollow fiber membrane module) for (Step 1) and (Step 3), and 12 m$^3$/hr (4 m$^3$/hr per hollow fiber membrane module) for (Step 2). The total operation time from (Step 1) to (Step 3) in the filtration step was approximately 28 minutes. The amount of to-be-treated water supplied into the first tank in (Step 2) was the same as the membrane filtration flow rate.

After the completion of the aforementioned filtration step, the physical washing step was carried out. In the physical washing step, backwash and gas washing using air were carried out at the same time. The backwash flow rate was set to 12 m$^3$/hr (4 m$^3$/hr per membrane module), and the flow rate of the air used in the gas washing was set to 12 Nm$^3$/hr (4 Nm$^3$/hr per membrane module).

The filtration step and the physical washing step were repeated five times to adjust the internal concentration rate of the first tank to 100 times (recovery rate: 99.0%). Then, the elimination step of eliminating the concentrated wastewater from the first tank was carried out. In the elimination step of eliminating suspended substances dissociated by the physical washing step, the suspended substances were eliminated by fully opening a drain installed in the lowest part of the first tank. The concentrated wastewater was completely eliminated from the first tank by fully opening a valve for 15 seconds after a pressure-type liquid surface sensor installed in the lowest part detected an intra-tank water depth of 0 m.

As a result of operation for approximately 8 months under the aforementioned operation conditions of the continuous operation, stable operation was achieved at an transmembrane pressure of 50 kPa or lower. It was also demonstrated that because of the high strength coefficient of the porous membrane, even long-term filtration operation is stably achieved without crushing the membrane.

Comparative Example 1

A porous hollow fiber membrane was produced in the same way as in Example 1 except that the discharge temperature of the melt-kneaded product was set to 220° C., and the extrudate in a hollow fiber form was travelled in the air for 1.1 seconds and then led to a coagulation bath containing water of 30° C.

Comparative Example 2

A porous hollow fiber membrane was produced in the same way as in Example 1 except that the free traveling time was set to 0.4 seconds.

Comparative Example 3

A porous hollow fiber membrane was produced in the same way as in Example 2 except that the discharge temperature of the melt-kneaded product was set to 205° C., and the extrudate in a hollow fiber form was travelled in the air for 0.9 seconds and then led to a coagulation bath containing water of 50° C.

Comparative Example 4

A porous hollow fiber membrane was produced in the same way as in Example 2 except that the membrane thickness was set to 0.28 mm, and the free traveling time was set to 1.2 seconds.

External pressure-type hollow fiber membrane modules were produced in the same way as in Examples 1 to 4. As a result, the transmembrane pressure reached 75 kPa, and the differential pressure was further on the rise. The porous hollow fiber membranes of Examples 1 to 4 had small resistance during filtration owing to a small membrane thickness, and were able to increase an inside diameter. Therefore, pressure loss within the hollow parts of the porous hollow fiber membranes were able to be reduced, probably leading to the large difference in transmembrane pressure.

TABLE 1

|   |   |   |   | Example 1 | Comparative Example 1 | Comparative Example 2 |
|---|---|---|---|---|---|---|
| Production conditions | | Resin | — | PVDF | PVDF | PVDF |
| | | Amount of resin added | wt % | 40.0 | 40.0 | 40.0 |
| | | Organic liquid | — | DEHP/DBP | DEHP/DBP | DEHP/DBP |
| | | Amount of organic liquid | wt %/wt % | 30.8/6.20 | 30.8/6.20 | 30.8/6.20 |
| | | Additive | — | Fine powder silica | Fine powder silica | Fine powder silica |
| | | Amount of additive | wt % | 23.1 | 23.1 | 23.1 |
| | | Parameter P | — | 7.9 | 7.9 | 7.9 |
| | | Discharge temperature of melt-kneaded product | ° C. | 240 | 220 | 240 |
| | | Coagulation bath | — | Water | Water | Water |
| | | Coagulation bath temperature | ° C. | 30 | 30 | 30 |
| | | Free traveling time | sec | 0.90 | 1.10 | 0.4 |
| | | Cooling rate | ° C./sec | 233 | 173 | 525 |
| | | Fluid for hollow formation | — | Air | Air | Air |
| Various performances, etc. | | Rate of pure water permeation | L/m2/hr | 6000 | 6000 | 6000 |
| | | Inside diameter | mm | 0.81 | 0.81 | 0.81 |
| | | Membrane thickness | mm | 0.22 | 0.22 | 0.22 |
| | | Compressive strength | Mpa | 0.40 | 0.15 | 0.20 |
| | | Strength coefficient | Mpa | 2.5 | 0.9 | 1.2 |
| | Surface FB | Thickness of backbone | μm | 0.31 | 0.32 | 0.32 |
| | | Coefficient of variation in thickness of backbone | % | 52 | 100 | 80 |
| | | Pore size | μm | 0.40 | 0.40 | 0.40 |
| | | Pore ratio | % | 35 | 35 | 35 |
| | | Pore structure | — | Three-dimensional network | Three-dimensional network | Three-dimensional network |
| | Surface FA | Pore size | nm | 380 | 380 | 380 |
| | | Pore ratio | % | 30 | 30 | 30 |
| | | Pore structure | — | Three-dimensional network | Three-dimensional network | Three-dimensional network |
| | | Maximum transmembrane pressure during filtration operation | kPa | 50 | >75 | >75 |

TABLE 2

|   |   |   |   | Example 2 | Example 3 | Example 4 | Comparative Example 3 | Comparative Example 4 |
|---|---|---|---|---|---|---|---|---|
| Production conditions | Layer (A) | Resin | — | PVDF | PVDF | PVDF | PVDF | PVDF |
| | | Amount of resin added | wt % | 34.0 | 34.0 | 34.0 | 34.0 | 34.0 |
| | | Organic liquid | — | DEHP/DBP | DEHP/DBP | DEHP/DBP | DEHP/DBP | DEHP/DBP |
| | | Amount of organic liquid | wt %/wt % | 27.1/13.5 | 27.1/13.5 | 27.1/13.5 | 27.1/13.5 | 27.1/13.5 |
| | | Additive | — | Fine powder silica | Fine powder silica | Fine powder silica | Fine powder silica | Fine powder silica |
| | | Amount of additive | wt % | 25.4 | 25.4 | 25.4 | 25.4 | 25.4 |
| | | Parameter P | — | 7.6 | 7.6 | 7.6 | 7.6 | 7.6 |

TABLE 2-continued

|  |  |  |  | Example 2 | Example 3 | Example 4 | Comparative Example 3 | Comparative Example 4 |
|---|---|---|---|---|---|---|---|---|
|  | Layer (B) | Resin | — | PVDF | PVDF | PVDF | PVDF | PVDF |
|  |  | Amount of resin added | wt % | 40.0 | 40.0 | 40.0 | 40.0 | 40.0 |
|  |  | Organic liquid | — | DEHP/DBP | DEHP/DBP | DEHP/DBP | DEHP/DBP | DEHP/DBP |
|  |  | Amount of organic liquid | wt %/wt % | 31.6/5.30 | 31.6/5.30 | 31.6/5.30 | 31.6/5.30 | 31.6/5.30 |
|  |  | Additive | — | Fine powder silica | Fine powder silica | Fine powder silica | Fine powder silica | Fine powder silica |
|  |  | Amount of additive | wt % | 23.1 | 23.1 | 23.1 | 23.1 | 23.1 |
|  |  | Parameter P | — | 8.0 | 8.0 | 8.0 | 8.0 | 8.0 |
|  |  | Discharge temperature of melt-kneaded product | °C. | 240 | 220 | 205 | 205 | 240 |
|  |  | Coagulation bath | — | Water | Water | Water | Water | Water |
|  |  | Coagulation bath temperature | °C. | 30 | 30 | 30 | 50 | 30 |
|  |  | Free traveling time | sec | 0.90 | 0.90 | 0.90 | 0.90 | 1.20 |
|  |  | Cooling rate | °C./sec | 233 | 211 | 194 | 172 | 175 |
|  |  | Fluid for hollow formation | — | Air | Air | Air | Air | Air |
| Various performances, etc. |  | Rate of pure water permeation | L/m2/hr | 8000 | 8000 | 8000 | 8000 | 7000 |
|  |  | Inside diameter | mm | 0.81 | 0.81 | 0.78 | 0.81 | 0.67 |
|  |  | Membrane thickness | mm | 0.22 | 0.22 | 0.22 | 0.22 | 0.28 |
|  |  | Compressive strength | Mpa | 0.40 | 0.30 | 0.30 | 0.20 | 0.80 |
|  |  | Strength coefficient | Mpa | 2.5 | 1.9 | 1.7 | 1.2 | 1.4 |
|  | Surface FB | Thickness of backbone | μm | 0.28 | 0.28 | 0.28 | 0.28 | 0.30 |
|  |  | Coefficient of variation in thickness of backbone | % | 45 | 70 | 65 | 90 | 95 |
|  |  | Pore size | μm | 0.56 | 0.52 | 0.52 | 0.55 | 0.4 |
|  |  | Pore ratio | % | 38 | 37 | 37 | 36 | 30 |
|  |  | Pore structure | — | Three-dimensional network | Three-dimensional network | Three-dimensional network | Three-dimensional network | Three-dimensional network |
|  | Surface FA | Pore size | nm | 300 | 300 | 300 | 290 | 200 |
|  |  | Pore ratio | % | 40 | 40 | 40 | 40 | 40 |
|  |  | Pore structure | — | Three-dimensional network | Three-dimensional network | Three-dimensional network | Three-dimensional network | Three-dimensional network |
|  |  | Maximum transmembrane pressure during filtration operation | kPa | 45 | 45 | 50 | >75 | >75 |

REFERENCE SIGNS LIST

10 Extruder
20 Nozzle for hollow fiber formation
30 Coagulation bath
40 Porous hollow fiber membrane
50 Roller
S Free traveling part
a Thermoplastic resin
b Void part

The invention claimed is:

1. A porous hollow fiber membrane made of a thermoplastic resin and having a pre-filtration side and a filtration side, wherein the porous hollow fiber membrane has:
a membrane thickness of 0.050 mm or larger and 0.25 mm or smaller,
a strength coefficient K of 1.7 or more, where the strength coefficient K is defined as K=(compressive strength)/((membrane thickness)/(inside diameter/2))$^3$, and
a rate of pure water permeation of 1200 L/m$^2$/hr or more, and
wherein a coefficient of variation in a thickness of a backbone forming a surface on the filtration side is 70% or less, and
the thickness of the backbone is a shortest distance between adjacent pores measured in a direction perpendicular to a longitudinal direction on the surface of the filtration side of the hollow fiber membrane.

2. The porous hollow fiber membrane according to claim 1, wherein a pore ratio of the surface on the filtration side is 32% or more.

3. The porous hollow fiber membrane according to claim 1, wherein the thickness of a backbone forming a surface on the filtration side is 0.20 μm or larger and 20 μm or smaller.

4. The porous hollow fiber membrane according to claim 1, wherein the inside diameter is 0.75 mm or larger, the compressive strength is 0.30 MPa or more, and the porous hollow fiber membrane is in a hollow fiber form having a three-dimensional network structure.

5. The porous hollow fiber membrane according to claim 1, wherein the porous hollow fiber membrane comprises at least two layers.

6. The porous hollow fiber membrane according to claim 1, wherein the porous hollow fiber membrane comprises at least two layers, a pore ratio of a surface on the pre-filtration side is 32% to 60%, and a pore size is 500 nm or smaller.

* * * * *